July 31, 1951  R. O. RUNDQUIST  2,562,335
HEM GAUGE
Filed Dec. 17, 1947
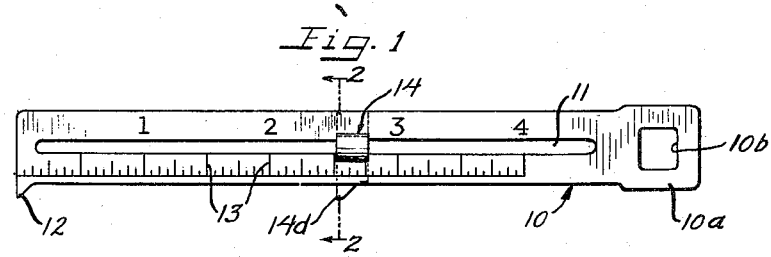
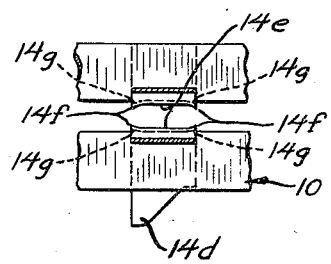
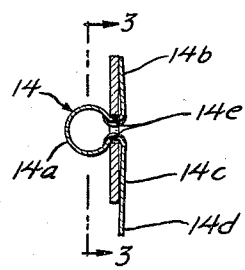
Inventor
Roy O. Rundquist
by  Attys.

Patented July 31, 1951

2,562,335

UNITED STATES PATENT OFFICE 2,562,335

HEM GAUGE

Roy O. Rundquist, Chicago, Ill., assignor to Pelouze Manufacturing Co., Evanston, Ill., a corporation of Illinois Application December 17, 1947, Serial No. 792,214

3 Claims. (Cl. 33—143)

1

This invention relates to a measuring device, and particularly to a hem gauge.

There has heretofore been disclosed an unusually simple and effective hem gauge comprising an elongated strip having a longitudinally disposed slot therein and measuring indicia along such slot. A marker element was provided to cooperate with such measuring indicia comprising an element formed from a spring metal band having a reduced width neck portion resiliently engaged in the elongated slot and a laterally projecting pointer portion which cooperated with the indicia to indicate the position of the marker element relative to one end of the gauge. This general type of gauge is shown in United States Patent No. 1,700,857, issued February 5, 1929.

In a gauge of this type, it is, of course, necessary that the marker element have a certain amount of resilience so that such marker element resiliently exerts a substantial lateral force against the side walls of the supporting slot in order to assure that the marker element will remain at a selected position along such slot. As a result, when the marker element is shifted along the slot, the cooperating walls of the neck portion of the marker element are urged against the flat walls with considerable force.

So long as the slotted body portion of the gauge was formed of material of greater or substantially equal hardness to that of the marker element, no particular deterioration of the gauge was produced by the successive movements of the marker element along the slot, although it was observed that it was difficult to produce a smooth movement of the marker element. As a result of recent developments, it has become economically feasible to utilize materials other than steel for forming the slotted body portion of the gauge. For example, aluminum, magnesium, alloys of such metals, or various plastic compositions are now available at prices comparable to that of steel and the corrosion and tarnish resisting properties of these materials make it extremely desirable that they be employed in an instrument such as a hem gauge which is expected to provide a lifetime of service for the purchaser. However, when a spring metal marker element constructed in accordance with the disclosure of the above referred to patent was utilized in conjunction with a slotted body member formed of one of these new materials, the substantial difference in hardness of the spring metal marker element caused the leading edges of such marker element to gouge, scratch and otherwise mar the supporting side walls of the

2 slot formed in the softer material. As a result, the gauge could be utilized for relatively few measuring operations before the interior surfaces of the slot were sufficiently roughened as to make the operation of the gauge very difficult, if not impossible.

Furthermore, it is desirable that the marker element be formed of hardened spring steel, but the configuration of such prevented the forming of the marker from spring hardened material.

Accordingly, it is an object of this invention to provide an improved measuring device, such as a hem gauge, of the type wherein a marker element is slidably movable along and supported by an elongated slot provided in the body portion of the gauge.

Another object of this invention is to facilitate the manufacture of the resilient marking element by forming such element from soft steel and subsequently heat-treating to produce the desired resilient characteristics.

A particular object of this invention is to provide an improved hem gauge of the slot type wherein a deformed spring band marking element is positionable along a supporting slot by virtue of the inherent resilience of such band, and wherein the body portion of the gauge defining the measuring slot is formed from material having substantially less hardness than that of the spring band.

The specific nature of the invention, as well as other objects and advantages thereof, will become apparent to those skilled in the art from the following detail description of the annexed sheet of drawings which, by way of preferred example only, illustrate one specific embodiment of the invention.

On the drawings:

Figure 1 is an elevational view of an assembled hem gauge embodying this invention;

Figure 2 is an enlarged scale sectional view taken on the plane II—II of Figure 1; and Figure 3 is a partial sectional view taken on the plane III—III of Figure 2.

As shown on the drawings:

Referring to Figure 1, the measuring device embodying this invention comprises an elongated sheet-like body member 10 having a central slot 11 extending substantially its full length. At one end, the body member is slightly transversely enlarged to provide a grasping portion 10a which may, if desired, be supplied with a square aperture 10b to facilitate the grasping of the gauge by the fingers of the user.

At the opposite end, the body member 10 is provided with a pointer-like lateral projection 12 whose edge is flush with the side edge of the body member 10 and is utilized as a reference point for the gauge. Extending along the gauge from such reference edge are engraved or embossed measuring indicia 13 which, of course, are laid out in inches or any other convenient measuring unit.

To cooperate with the indicia 13, a marking element 14 is provided which is supported by, and slidable in, the slot 11. The marking element 14 is preferably integrally formed from a band of spring steel or other material having similar permanent resilient properties. Marker 14 is of generally U-shaped configuration, having the closed end portion 14a thereof somewhat cylindrically enlarged to provide a bulbous grasping portion by which the marker may be conveniently moved by the fingers of the operator. The free ends 14b and 14c of the marker 14 are each bent to project laterally with respect to the length of the body member 10 and in opposite direction relative to each other and form arm portions, which when inserted in the slot 11 and the marker 14 is in place therein, are inclined from their inner ends toward the blade and yieldably engage the blade at their outer ends and urge the bulbous portion 14a towards the slot 11. The one free end 14c is somewhat larger than the other free end and is shaped into pointer configuration as indicated at 14d. Pointer portion 14d projects laterally beyond the longitudinal edge of the body member 10 and hence provides a convenient visual indication of the position of the marker element 14 with respect to the scale indicia 13.

Intermediate the bulbous portion 14a and the laterally extending free ends 14b and 14c, the marker element 14 defines a neck portion 14e wherein the opposed portions of the band are substantially parallel. Obviously, the effective lateral width of neck portion 14e may be varied by stressing of the bulbous portion 14a. The unstressed lateral width of neck portion 14e is preferably selected to be somewhat greater than the width of the slot 11 so that when the marker element 14 is assembled to the body member 10 with the neck portion 14e engaged in the slot 11, a substantial inward displacement of the neck portion 14e will be produced, thus producing a resilient biasing force which with the biasing force of the arm portions 14b and 14c hold the outer surfaces of neck portion 14e snugly in engagement respectively with the opposed side walls of the longitudinal slot 11. The amount of this frictional force is selected to be sufficiently large so as to insure that the marker element 14 will remain in any selected position along the slot 11, irrespective of accidental bumps or jarring of the gauge. Of course, to assemble the marker element 14 in the slot 11, the two slot defining portions of the body member 10 are stressed apart sufficiently to permit the bulbous portions 14a of the marker 14 to be inserted therethrough, whereafter the marker element 14 is secured in assembly to the body member 10 by virtue of the fact that the bulbous portion 14a and the laterally extending end portions 14b and 14c are both transversely larger than the width of the slot 11 and respectively disposed on opposite sides of the body member 10.

In order to permit the body member 10 to be formed from aluminum, magnesium or plastic materials having non-corrosive properties, this invention provides a unique configuration of the neck portion 14e of the marker element 14. As best shown in Figure 3, all four of the edges 14f of the neck portion 14e, i. e., both the leading and trailing edges of each arm defining the neck portion 14e, are shaped so as to present a generally arcuate surface into engagement with the respective side walls of the slot 11, as the marker element 14 is moved therealong. In particular, as shown in Figure 3, all four of the edges 14f are deformed inwardly by a stamping operation thus providing arcuate surfaces 14g. This construction insures that, as the marker element 14 is moved along the slot 11, neither the leading nor the trailing edges of the neck portion 14e of such marker element will tend to dig in or gouge the relatively soft material of the body member 10. Therefore, even though a substantial compressive force is exerted against the side walls of the slot 11 by the inherent resilience of the marker element 14, such marker element may be freely slid along the slot 11 in a smooth, continuous movement. Obviously, such smooth, continuous movement of the marker element 14 greatly facilitates the setting of the marker element 14 to any desired point of the scale indicia 13.

With the described configuration of the marker element, it is impractical to form such from spring hardened steel. In accordance with this invention the marker element 14 is formed completely from soft steel, or the like, and is then heat treated to provide the desired spring temper.

Therefore, from the foregoing description it is apparent that this invention provides an improved hem gauge which will permit the use of non-corrosive and non-tarnishable materials to form the body portion of the gauge without subjecting such relatively soft material to the digging, scratching or gouging action of the spring metal marking element. Furthermore, the sliding movement of the marking element along the body portion of the gauge is free from annoying jerks and binds which have characterized gauges heretofore known. As a result, the adjustment of the gauge may be more conveniently and rapidly effected. Lastly, the marker element may be formed of soft steel spring-tempered without complicating the manufacturing process.

It will, of course, be understood that various details of construction may be modified through a wide range without departing from the principles of this invention and it is, therefore, not the purpose to limit the patent granted herein otherwise than necessitated by the scope of the appended claims.

I claim as my invention:

1. In a measuring device having an elongated metal blade of a strip-like form having a scale extending along one side thereof and a longitudinal slot extending therealong inwardly of said scale, with a pointer-like projection extending from one end of said body adjacent said scale, the improvement comprising a pointer slidable along said slot and formed from an integral piece of relatively thin strip spring metal, said pointer having a bulbous outer portion of a generally cylindrical formation for engagement with the fingers, an intermediate restricted neck portion slidably engaged in said slot for movement therealong, and also having oppositely projecting relatively flat end portions inclined from the opposite end of said neck portion from said bulbous portion toward said bulbous portion and blade when said pointer is in place therein and yieldably engaging the portion of said blade opposite from said scale and resiliently urging said bulbous portion toward said slot, and the neck portion of said pointer intermediate said bulbous portion and said flat projecting end portions being inwardly flared at all four edges thereof and forming opposite arcuate engaging surfaces slidably engaging opposite sides of said slot.

2. A spring metal marker element for a slot-type hem gauge formed of material of less hardness than said marker element, comprising a band formed into generally U-shaped configuration and having the closed end thereof forming a bulbous configuration and the free ends respectively projecting laterally in opposite directions, the portion of said band intermediate said bulbous portion and said laterally projecting free end portions being closely spaced, thereby providing a neck portion whose effective width is variable by stressing said bulbous portion, said neck portion being adapted to be resiliently compressed when inserted in the slot of a hem gauge, said laterally projecting end portions being inclined inwardly from said neck portion toward the hem gauge when said marker element is inserted therein, to yieldably engage the blade of the gauge adjacent their ends, all four edges of said neck portion being bent inwardly to present arcuate surface engagement with the supporting slot walls of the gauge blade in either direction of movement of said marker element therealong.

3. In a measuring device having an elongated, strip-like body defining a longitudinally disposed slot, the improvement comprising a pointer integrally formed of spring steel, said pointer having a bulbous portion, oppositely projecting end portions and an intermediate neck portion disposed therebetween, said neck portion being resiliently compressible in a lateral direction to be insertable in and slidably movable along said slot, and said oppositely projecting end portions each being of substantially greater width than said slot to retain said pointer and assembly therein and yieldably engaging the side of said strip-like body opposite from said bulbous portion adjacent their outer ends, both the leading and trailing edges of said neck portion being inwardly deformed so as to present substantially arcuate engaging surfaces at both said leading and trailing edges to allow free movement of said pointer along said slot and to prevent gouging of the wall surfaces of said slot by movement of said pointer therealong in either direction, said pointer being completely formed with the metal thereof in an unhardened condition and then being heat-treated to produce a spring temper therein.

ROY O. RUNDQUIST.

REFERENCES CITED

The following references are of record in the file of this patent:

UNITED STATES PATENTS

| Number | Name | Date |
|---|---|---|
| 833,168 | Keller | Oct. 16, 1906 |
| 893,881 | Smith | July 21, 1908 |
| 1,406,774 | Straka | Feb. 14, 1922 |
| 1,458,046 | Garlatti | June 5, 1923 |
| 1,700,857 | Schultz | Feb. 5, 1929 |
| 2,408,746 | Evert | Oct. 8, 1946 |

FOREIGN PATENTS

| Number | Country | Date |
|---|---|---|
| 38,020 | Austria | July 26, 1909 |